INVENTOR
ROGER JULES JUSTIN BASSEREAU
By Linton and Linton, ATTORNEYS

April 30, 1963   R. J. J. BASSEREAU   3,087,355
CONSTANTLY VARIABLE SPEED TRANSMISSION
Filed Jan. 5, 1960   2 Sheets-Sheet 2
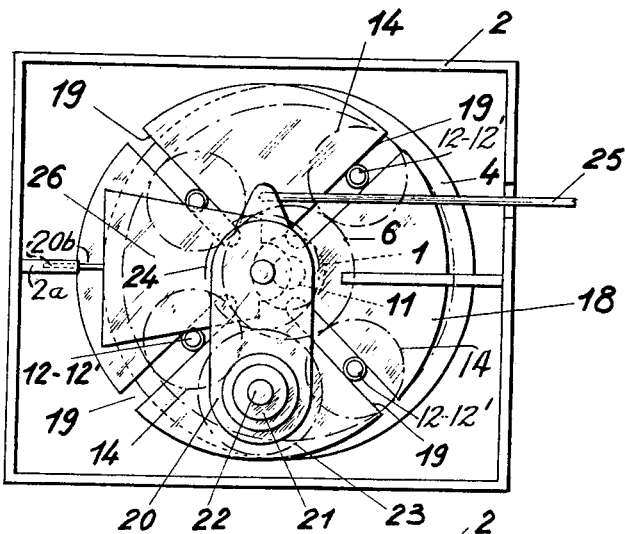
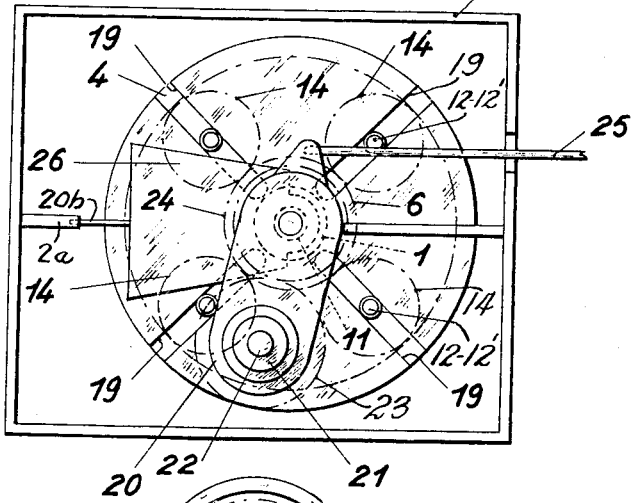
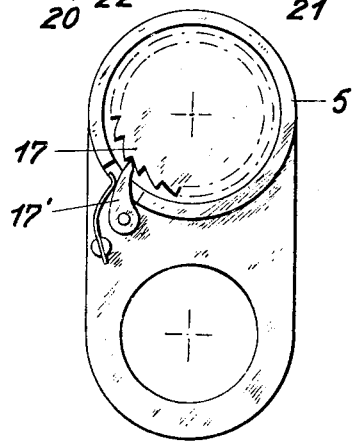
INVENTOR
ROGER JULES JUSTIN BASSEREAU
By  Linton and Linton, ATTORNEYS

United States Patent Office 3,087,355
Patented Apr. 30, 1963

3,087,355
CONSTANTLY VARIABLE SPEED TRANSMISSION
Roger Jules Justin Bassereau, 16 Rue Louis Frappart,
Aulnay-sous-Bois, France
Filed Jan. 5, 1960, Ser. No. 636
Claims priority, application France Jan. 6, 1959
2 Claims. (Cl. 74—793)

This invention provides a device whereby the initial rotary motion of a shaft can be progressively varied in speed, arrested, or reversed in direction.

The device combines the advantages of a spur-wheel transmission gear with absence of slip and of change-speed transmission gears with step-up or step-down transmission. It obviates the inconvenience of change-speed gears which cannot be made to run below a certain speed. Being able to step-down the speed progressively to a dead stop, it affords the advantages of a declutching device. Moreover, by its decelerating action, it can also fulfill the purpose of a brake.

The device is characterized in that relative rotation is obtained from the differences in length of travel between satellite pinions and a meshing planet wheel when the former are driven through the medium of slots in a rotating plate the axis of which can be moved radially with reference to the axis of the planet wheel meshing with the satellite pinions.

As will emerge from the following description and the accompanying drawing representing an exemplary but non-exclusive form or embodiment of the invention, the acceleration, deceleration, arresting and reversal of motion of this gear can be achieved within any desired range of the speed variation, without any possibility of slipping.

FIG. 1 of the drawing shows the arrangement in diagrammatic, sectional elevation;

FIG. 3 is a view similar to FIG. 2, but of reduced size and with the control lever moved to its middle position.

FIG. 4 is a view similar to FIG. 3, but with the control lever in its extreme right hand position, and FIG. 5 is a front elevation of a bearing ring forming part of the present device.

Figure 1:
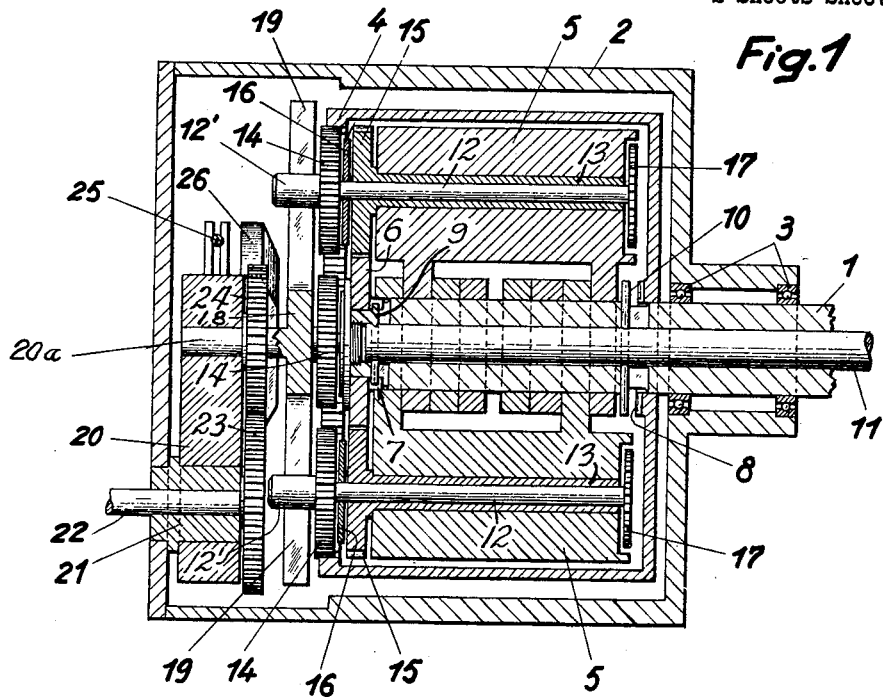
Figure 2:
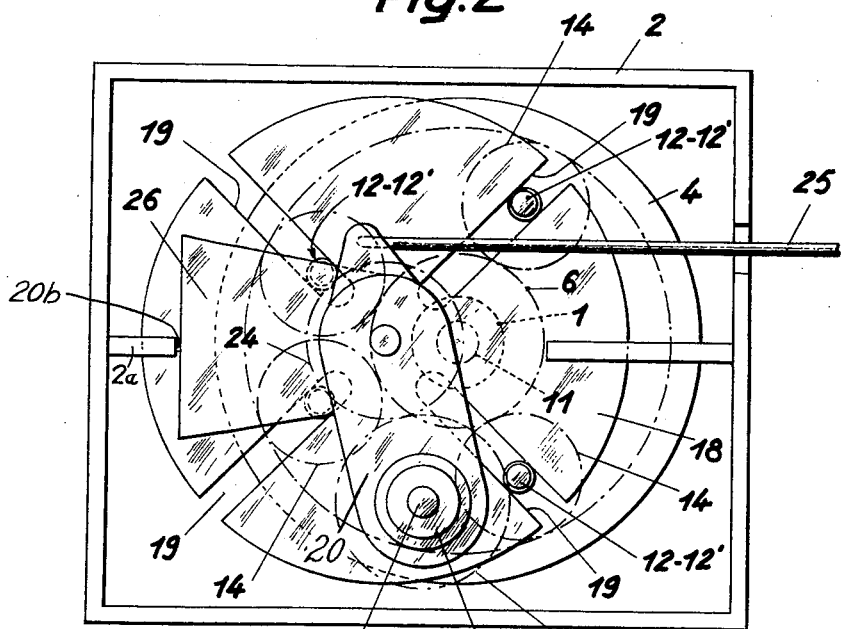
FIG. 2 is a left-hand end view of the arrangement according to FIG. 1, with the control lever positioned completely to the left and with the gear box cover removed.

As illustrated, a tubular shaft 1 journalled in a gear box 2 in bearings 3, rotatably supports a cylindrical member 4' having an internally-toothed ring gear 4 running freely on the shaft. Said shaft also carries a plurality of freely and independently rotatable supporting elements or bearing rings 5 and, at its inner end, a freely-running sun gear 6.

The ring gear 4 and the sun gear 6 can be alternately coupled with the shaft 1 by means of dogs 7 and 8 respectively engaging with pins 9 and 10, the bore of the shaft 1 being provided with a rod 11 controlling the displacement of these pins.

A bore in each of the bearing rings 5 receives co-axial spindles 12 and 13 respectively carrying planet pinions 14 and 15 which can be coupled by a clutch 16, each pinion or satellite 14 meshing with the ring gear 4, and each planet pinion 15 meshing with the central sun gear 6. Furthermore, each planet pinion is able to rotate in only one direction, in that a ratchet wheel 17 fixed on the spindle 12 coacts with a pawl 17' on the pertaining movable bearing ring 5.

A front plate 18 has radial slots 19 receiving the ends 12' of the spindles 12 of the planet pinions 14, working in plain or roller bearings. This plate can be displaced radially by means of a block 20 carried on the plate spindle 20a and rotating on an element 21 forming part of the gear box 2. Element 21 is axially traversed by the power input shaft 22 the motion of which is communicated to the spindle 20a of the plate 18 as by means of two gear wheels 23 and 24. A screw or lever 25 enables manual or automatic control of the radial displacement of the plate 18. The greater the number of bearing rings 5 provided, the smoother will be the action of the transmission.

The operation of the arrangement described is as follows:

When the axis of the plate 18 is in line with the axis of the shaft 1, the planet pinions 14 are unable to roll over the ring gear 4, by reason of the pawls 17' which drive said ring gear with the same speed as the plate 18. The entire gear assembly rotates integrally without loss of power, there being no relative motion of the internal parts.

When the plate 18 is moved eccentrically, the length of travel of the planet pinions is increased in the direction contrary to the direction of eccentric displacement of the plate, for instance, by about a quarter of a turn of the plate, and decreased in the opposite direction. The planet pinions 14 moving in the direction opposite to the direction of eccentric displacement of the plate, drive the ring gear 4 at a higher speed than that of the plate 18.

The diametrically opposed planet pinions 14 having a shorter length of travel are obliged to rotate freely as long as they remain on that side to recover the difference in length of travel. The coupling between the planet pinions 14 and 15 is brought into action by means of a wedge block 26 pivotally connected at one end to spindle 20a forming part of the speed-controlling means, whereby the rotary motion of the planet pinions 14 is transmitted through the planet pinions 15 to the sun gear 6. Said wedge block 26 has a pin 20b slideably extending in tube 2a fixedly mounted on gear box 2 for preventing the movement of said wedge block laterally of said pin. That is, as the plate 18 is caused to revolve, it presents the ends 12' of each spindle 12 against said wedge block 26 which moves each spindle longitudinally whereby the clutch 16 engages pinions 14 and 15 and connects the same carried by the spindle engaging said wedge block together. Said sun gear consequently begins to run more slowly with reference to the rest of the gear system.

As a result if the shaft 1 and the ring gear 4 are coupled, there is, when all parts are in line, a direct power transmission, but the number of revolutions made per minute will progressively increase in the measure that the eccentric displacement of the plate 18 is increased; the shaft 1 being held coupled with the sun gear 6, there is a direct transmission of power, as in the preceding instance, but the eccentric displacement of the plate 18 now causes a progressive retardation of the running speed of the shaft 1, finally arresting, and then reversing the direction of its motion.

Depending on the purpose for which the gear is to be employed one of the alternative means of control may be omitted or its form of embodiment modified in form or dimensions within the scope of the invention. For example if a feed motion is to be imparted to the table of a milling machine having a fast forward stroke for the quick return of the table and a fast backstroke to bring the work under the cutter and a slow automatic feed stroke during the cutting operation, then the clutch elements can be omitted and substituted by ratchet wheels, the prevention of rotation thus taking place in a direction which is not required.

I claim:

1. A device for varying the speed, stopping or reversing the initial rotary motion of a shaft comprising a gear box, an input shaft, an output shaft, an internally-toothed ring gear rotatably mounted on said output shaft, a plurality of supporting elements freely mounted on said output shaft, a sun gear rotatably mounted on one end of said output shaft, a pair of dog clutches for alternately coupling said output shaft with said internally-toothed ring gear or with said sun gear, a plurality of spindles rotatably mounted on said supporting elements, a plurality of planet pinions each respectively on an end of one of said spindles and meshing with said ring gear, means for locking each of said planet pinions against rotation in one direction, a second plurality of planet pinions meshing with said sun gear and each mounted respectively on one of said first mentioned planet pinion spindles, a plurality of friction clutches each for coupling one of first mentioned planet pinions with the second mentioned planet pinion on its spindle, a plate for being driven by said input shaft, means for displacing the plate eccentrically with reference to said output shaft, said plate having radial slots with the ends of said first mentioned planet pinion spindles therein, and means for operating said friction clutches.

2. A device for varying the speed, stopping or reversing the initial rotary motion of a shaft comprising a gear box, an input shaft, an output shaft, a cylindrically shaped internally-toothed ring gear freely mounted on said output shaft for rotation therearound, supporting elements freely mounted on said output shaft for rotation therearound, a plurality of spindles rotatably mounted on said supporting elements, a sun gear freely mounted for rotation on one end of said output shaft, a pair of dog clutches for coupling said output shaft alternately to said internally-toothed ring gear or to said sun gear, a plurality of planet pinions each respectively positioned at one end of one of said spindles and meshing with said ring gear, a plurality of ratchets each keyed on the other end of one of said spindles, a plurality of pawls each attached to the corresponding supporting element of one of said ratchets so as to permit only unidirectional rotation thereof, a second plurality of planet pinions meshing with said sun gear, a plurality of tubular shafts each slidably surrounding one of said spindles and having one of said second mentioned planet pinions connected thereto, a plurality of friction clutches are each arranged between one of said first mentioned planet pinions and its corresponding second mentioned planet pinion for coupling the same together upon the sliding of the corresponding spindle, a rocking arm, a plate pivotally mounted on an end of said arm, a pair of gear wheels coupling said plate to said input shaft, a control lever for said rocking arm for eccentrically displacing said plate, said plate having radial slots with the ends of said spindles slideable therein, and a lateral cam connected to said arm carrying said plate positioned for being engaged by and sliding each of said spindles effecting the aforesaid coupling of said gear wheels with their respective planet pinions for driving said sun gear with a differential speed depending on the amount of the eccentric displacement of said plate.

References Cited in the file of this patent

UNITED STATES PATENTS

| | | |
|---|---|---|
| 1,172,936 | Burn | Feb. 22, 1916 |
| 1,944,370 | Reaney | Jan. 23, 1934 |
| 2,143,120 | Cavallo | Jan. 10, 1939 |
| 2,351,242 | Vaughn | June 13, 1944 |

FOREIGN PATENTS

| | | |
|---|---|---|
| 64,485 | Sweden | Mar. 16, 1926 |
| 151,843 | Austria | Dec. 10, 1937 |
| 465,110 | Great Britain | Apr. 26, 1937 |
| 415,879 | Italy | Nov. 7, 1946 |
| 535,945 | Belgium | Mar. 15, 1955 |